US010462449B2

(12) United States Patent
Sun et al.

(10) Patent No.: US 10,462,449 B2
(45) Date of Patent: Oct. 29, 2019

(54) METHOD AND SYSTEM FOR 360-DEGREE VIDEO PLAYBACK

(71) Applicant: Novatek Microelectronics Corp., Hsinchu (TW)

(72) Inventors: Min Sun, Hsinchu County (TW); Hou-Ning Hu, Taipei (TW); Yen-Chen Lin, Taoyuan (TW); Hsien-Tzu Cheng, Hsinchu (TW); Chieh-Cheng Chen, Changhua County (TW); Hung-Ming Wang, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 28 days.

(21) Appl. No.: 15/666,589

(22) Filed: Aug. 2, 2017

(65) Prior Publication Data

US 2018/0241984 A1 Aug. 23, 2018

Related U.S. Application Data

(60) Provisional application No. 62/462,359, filed on Feb. 23, 2017.

(51) Int. Cl.
*H04N 13/189* (2018.01)
*G06K 9/00* (2006.01)
(Continued)

(52) U.S. Cl.
CPC ....... *H04N 13/189* (2018.05); *G06K 9/00724* (2013.01); *G06K 9/4628* (2013.01);
(Continued)

(58) Field of Classification Search
CPC .. H04N 13/189; H04N 13/383; H04N 13/144; G06K 9/00724; G06K 9/3241; G06K 9/4628; G06K 9/6277; G06K 9/66
See application file for complete search history.

(56) References Cited

U.S. PATENT DOCUMENTS 9,760,806 B1 * 9/2017 Ning ................... B60W 50/14
2005/0254686 A1 * 11/2005 Koizumi ............. G06K 9/6203
382/103

(Continued)

OTHER PUBLICATIONS

Y.-C. Su, et al., "Pano2vid: Automatic cinematography for watching 360 videos," In Proceedings of the Asian Conference on Computer Vision (ACCV), Dec. 2016, pp. 1-16.

(Continued)

*Primary Examiner* — Thai Q Tran
*Assistant Examiner* — Sunghyoun Park
(74) *Attorney, Agent, or Firm* — JCIPRNET

(57) ABSTRACT

The disclosure proposes a method and a system for 360-degree video playback. The method is applicable to a video playback system and includes at least the following steps. A current frame of a 360-degree video having a sequence of frames is received. Candidate objects in the current frame are detected, and a main object is selected from the candidate objects by using a selector recurrent neural network (RNN) model based on information of the candidate objects in the current frame. A viewing angle corresponding to the current frame is computed by using a regressor RNN model based on the main object in the current frame. The current frame is displayed on the screen according to the viewing angle.

18 Claims, 5 Drawing Sheets

(51) Int. Cl.
*G06K 9/46* (2006.01)
*G06K 9/62* (2006.01)
*G06K 9/66* (2006.01)
*H04N 9/87* (2006.01)
*G06N 3/04* (2006.01)
*H04N 13/144* (2018.01)
*H04N 13/383* (2018.01)
*H04N 13/00* (2018.01)

(52) U.S. Cl.
CPC ............ *G06K 9/6277* (2013.01); *G06K 9/66* (2013.01); *G06N 3/0445* (2013.01); *H04N 9/87* (2013.01); *H04N 13/144* (2018.05); *H04N 13/383* (2018.05); *H04N 2013/0096* (2013.01)

(56) References Cited

U.S. PATENT DOCUMENTS

| | | | | |
|---|---|---|---|---|
| 2007/0053246 | A1* | 3/2007 | Sano | G11B 27/105 369/30.04 |
| 2008/0112593 | A1* | 5/2008 | Ratner | G06K 9/469 382/103 |
| 2008/0181453 | A1* | 7/2008 | Xu | G06T 7/215 382/103 |
| 2010/0191727 | A1* | 7/2010 | Malik | G06F 3/013 707/734 |
| 2011/0310219 | A1* | 12/2011 | Kim | G08B 13/19643 348/36 |
| 2016/0381306 | A1* | 12/2016 | Yang | G06T 3/40 386/280 |

OTHER PUBLICATIONS

J. Chen, et al., "Learning Online smooth predictors for realtime camera planning using recurrent decision trees," IEEE Conference on Computer Vision and Pattern Recognition (CVPR), Jun. 27-30, 2016, pp. 1-14.

J. Chen et al., "Mimicking human camera operators," IEEE Winter Conference on Applications of Computer Vision (WACV), Jan. 5-9, 2015. pp. 215-222.

J. Foote et al. "Fly Cam: Practical panoramic video and automatic camera control," 2000 IEEE International Conference on Multimedia and Expo, 2000. ICME 2000, Jul. 30-Aug. 2, 2000, pp. 1-4.

Hou-Ning Hu et al., "Deep 360 Pilot: Learning a Deep Agent for Piloting through 360∘ Sports Videos," Computer Vision Foundation, May 4, 2017, pp. 3451-3460.

* cited by examiner

METHOD AND SYSTEM FOR 360-DEGREE VIDEO PLAYBACK

CROSS-REFERENCE TO RELATED APPLICATION

This application claims the priority benefits of U.S. provisional application Ser. No. 62/462,359, filed on Feb. 23, 2017. The entirety of the above-mentioned patent application is hereby incorporated by reference herein and made a part of this specification.

TECHNICAL FIELD

The disclosure relates to a method and a system for 360-degree video playback.

BACKGROUND

With rapidly advancing computer, network, and digital imaging technologies, there is an astronomical amount of video data for a wide range of applications, especially in digital playback devices such as digital video recorders, high-definition televisions, home theater computers, video conferencing devices, smart phones, and so forth. Thanks to the readily availability of consumer-grade and production-grade 360-degree cameras as well as the promotion of 360-degree video platforms by social media giants such as YouTube and Facebook, the fast adoption of 360-degree videos has been boosted throughout the years. It is expected that 360 videos will become a dominant video playback format in the near future.

360-degree videos give a viewer an immersive experience through displaying full surrounds of a camera in a spherical canvas. In many circumstances a viewer has a limited field of visual attention, and studying how to display 360-degree videos during playback has thus emerged as an increasingly important problem. Hand manipulation and virtual reality are so far two primary ways for displaying 360-degree videos on a device with a natural field of view (NFoV). In hand manipulation, a viewer navigates a 360-degree video via a sequence of mouse clicks, and whereas in VR, a viewer uses embedded motion sensors in a VR headset for navigation. Note that both HM and VR would require a viewer to select a viewing angle for each frame, while the FoV is defined by the device. However, such selection mechanism could be cumbersome and tedious, particularly for video footage in which subjects are actively moving and changing their locations continuously. In fact, recent research studies have shown that both HM and VR could cause a viewer to feel fatigue and discomfort.

SUMMARY OF THE DISCLOSURE

Accordingly, the disclosure is directed to a method and a system for 360-degree video playback that provide an elegant approach to accurately and smoothly capture events of interest in a 360-degree video.

In one of the exemplary embodiments, the proposed method is applicable to a video playback system and includes at least the following steps. A current fame of a 360-degree video having a sequence of frames is received. Candidate objects in the current frame are detected, and a main object is selected from the candidate objects by using a selector recurrent neural network (RNN) model based on information of the candidate objects in the current frame. A viewing angle corresponding to the current frame is computed by using a regressor RNN model based on the main object in the current frame. The current frame is displayed on the screen according to the viewing angle.

In one of the exemplary embodiments, the proposed system at least includes a screen, a data storage device, and a processor, where the processor is coupled to the screen and the data storage device. The processor is configured to receive a current frame of a 360-degree video having a sequence of frames, detect candidate objects in the current frame, select a main object from the candidate objects by using a selector RNN model based on information of the candidate objects in the current frame, compute a viewing angle corresponding to the current frame by using a regressor RNN model based on the main object in the current frame, and display the current frame on the screen according to the viewing angle.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
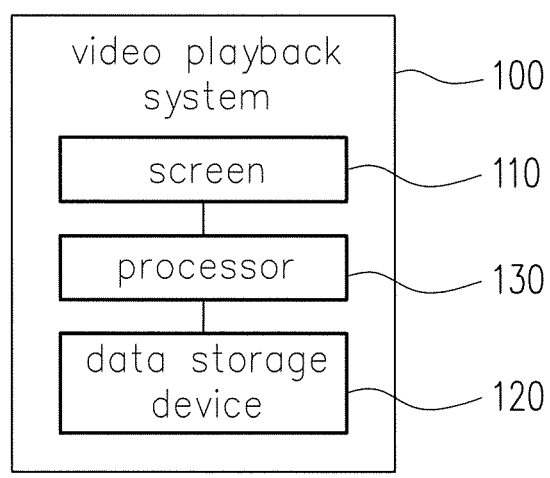
FIG. 1 illustrates a schematic block diagram of a video playback system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic block diagram of video playback system which utilizes the proposed method of 360-degree video playback from the hardware perspective in accordance with one of the exemplary embodiments of the disclosure.

Referring to FIG. 1, an exemplary video playback system 100 would include, but not limited to, a screen 110, a data storage device 120, and a processor 130. The video playback system 100 may be implemented as a stand-alone electronic device capable of video playback such as a personal computer, a laptop computer, a tabular computer, a digital video camera, a smart phone, and so forth. The video playback system 100 may also be implemented as separate devices including a host computer system, such as a Blu-ray player, a DVD player, a set-top box, a video game console, a digital video recorder, connected to peripheral devices via a wireless or wired connection.

The screen 110 would be configured to display information and may be a liquid crystal display (LCD), an organic light emitting diode (OLED) display, a light emitting diode (LED) display, or the like.

The data storage device 120 would be configured to store programming codes, device configurations, look up tables, buffered or permanent data, video and so forth. The data storage device 120 could be volatile or permanent memories such as a stationary or mobile random access memory (RAM), a read-only memory (ROM), a flash memory, a hard drive, or other similar devices or circuits.

The processor 130 would be configured to implement functional elements of the proposed method of displaying a 360-degree video in the following exemplary embodiments. The functions of the processor 130 may be implemented by using one or multiple programmable units such as a field programmable array (FPGA), a programmable logic device (PLD), an application specific integrated circuit (ASIC), a central processing unit (CPU), a programmable general purpose or special purpose microprocessor, microcontroller, a digital signal processor (DSP), a programmable logic device (PLD), other similar devices or circuits, or a combination thereof. The functions of the processor 140 may also be implemented with separate electronic devices or integrated circuits (ICs), and functions of the processor 130 may also be implemented with hardware or software or a combination of both.

Figure 2:
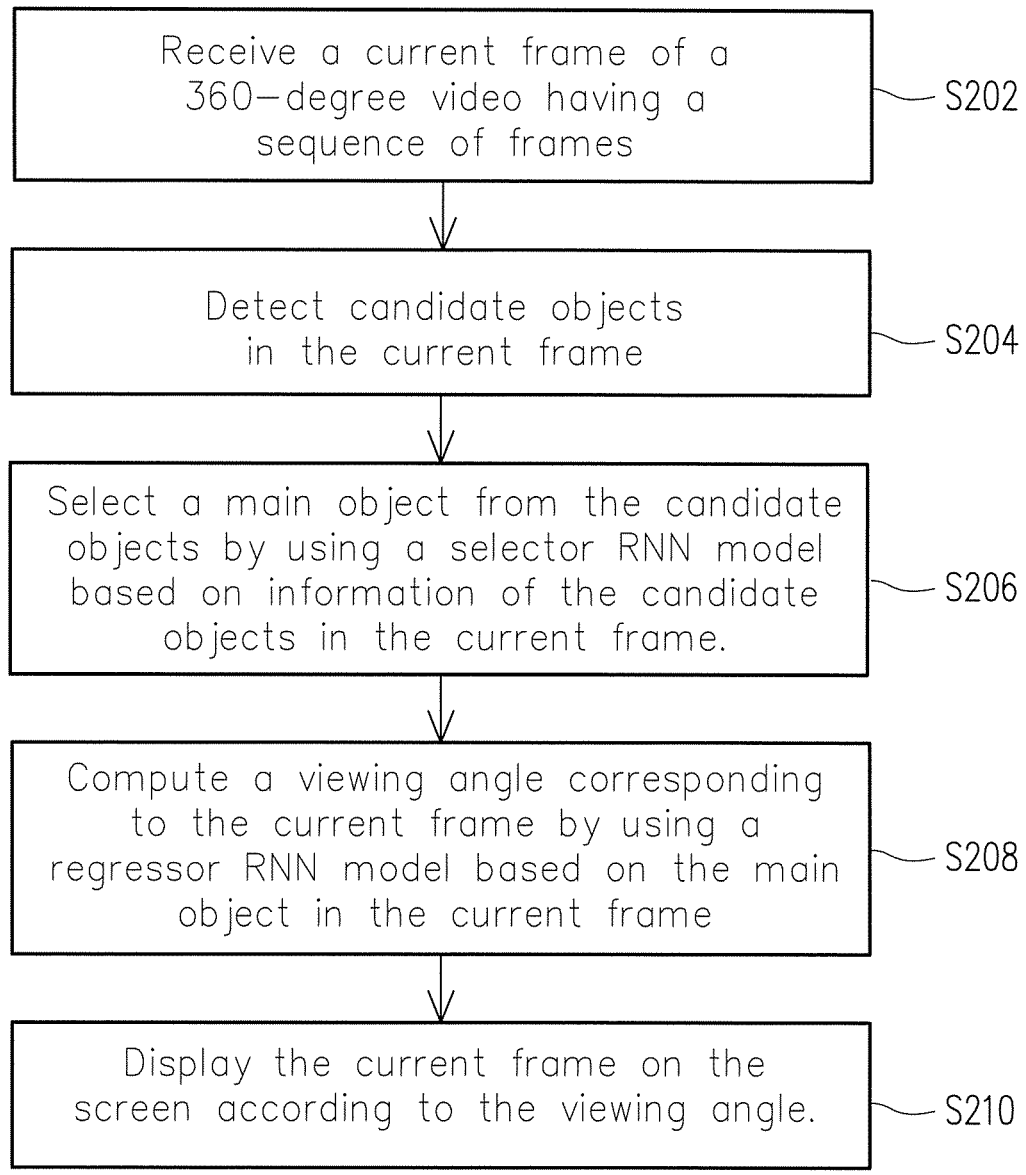
FIG. 2 illustrates a flowchart of a method of 360-degree video playback in accordance with one of the exemplary embodiments of the disclosure.

FIG. 2 illustrates a flowchart of a method of 360-degree video playback in accordance with one of the exemplary embodiments of the disclosure. The steps of FIG. 2 may be implemented by the proposed video playback system 100 as illustrated in FIG. 1. For illustrative purposes, the 360-degree video would be a 360-degree sports video or a video including any moving object.

Referring to FIG. 2 along with FIG. 1, the processor 130 of the video playback system 100 would receive a current frame of a 360-degree video having a sequence of frames (Step S202). Herein, each frame including the current frame in the 360-degree video is a panoramic image. Suppose that the current frame is a t-th frame of the 360-degree video. The sequence of frames that up to time t is referred to as $V_t = \{v_1, \ldots, v_t\}$.

Next, instead of extracting information from the whole frame, the processor 130 would detect candidate objects in the current frame (Step S204). In the present exemplary embodiment, foreground objects may be set as the candidate objects for two reasons. Firstly, in sports videos, foreground objects are typically the targets to be followed. Moreover, the relative size of foreground objects is small compared to the whole panoramic image. If the image processing is done at the frame level, information of object fine details such as appearance feature, motion feature, and position would be diluted. On the other hand, working with object-based observations would assist the processor 130 to extract subtle appearance and motion cues to take an action. Suppose that the object-level observation $V_t^O$ is defined as follows, $$V_t^O = \{v_1^O, \ldots, v_t^O\} \qquad \text{Eq(1)}$$

where $v_t^O$ is given by $$v_t^O = \text{con}_V(O_t, P_t, M_t), \qquad \text{Eq(2)}$$

$$O_t = \text{con}_H(\{o_t^i\}), P_t = \text{con}_H(\{p_t^i\}), \text{ and } M_t = \text{con}_H(\{m_t^i\}) \qquad \text{Eq(3)}$$

Note that $\text{con}_H(\ )$ and $\text{con}_V(\ )$ denote horizontal and vertical concatenation of vectors respectively. The vector $o_t^i \in R^d$ denotes the i-th object's appearance feature, the vector $p_t^i \in R^2$ denotes the i-th object's position on the view sphere at frame t, and the vector $m_t^i \in R^k$ denotes the i-th object's motion feature. For example, if there exist N candidate objects, the dimension of $O_t$, $P_t$, and $M_t$ are d×N, 2×N, and k×N respectively. Then the dimension of concatenated object feature $v_t^O$ is (d+2+k)×N. Herein, the processor 130 would replace $V_t$ with $V_t^O$ which consists of appearance, motion, and position of the objects.

It is known that as watching a sports video, a viewer gazes at the main object of interest. Hence, once the candidate objects are detected, the processor 130 would select a main object from the candidate objects by using a selector RNN model based on the information of the candidate objects in the current frame (Step S206). In detail, since the processor 130, from a perspective of a machine, does not know which candidate object is the main object, the processor 130 may first obtain the information of each of the candidate objects and compute a current state of the selector RNN model corresponding to the current frame based on the information of each of the candidate objects and a previous state of the selector RNN model corresponding to a previous frame. The processor 130 may then able to classify the main object from the candidate objects according to the selector RNN model. The current state $h_t$ of the selector RNN model may be expressed as follows, $$h_t = \text{RNN}_S(v_t^O, h_{t-1}), \qquad \text{Eq(4)}$$

In other words, the selector RNN model may aggregate the information from the current frame $v_t^O$ and the past state $h_{t-1}$ to update the current state $h_t$ to reduce the computation cost.

In an exemplary embodiment, the processor 130 would map the current state of the selector RNN model to a probability distribution according to assigned weights of the candidate objects by using a softmax layer and classify the main object according to the probability distribution. The probability distribution $S_t$ may be expressed as follows, $$S_t = \text{softmax}(W_S h_t) \qquad \text{Eq(5)}$$

That is, the softmax layer may map the current state $h_t$ of the selector RNN model into the probability distribution $S_t$ via the assigned weights $W_S$. Note that the assigned weights may be determined in a model training stage and prestored in the data storage device 120. Each assigned weight depends on the characteristics of the corresponding candidate object. For example, in sports videos, the candidate object corresponding to a human in motion may have a larger assigned weight than other candidate objects.

In terms of the classification, the processor 130 would predict the probability that the candidate object i is the main object as follows, $$S_t = \pi(V_t^O) \in [0,1]^N \quad \text{Eq(6)}$$

where $$\sum_i S_t(i) = 1.$$

Given $S_t$, the main object i* may be expressed as follows, $$i^* = \arg\max_i S_t(i). \quad \text{Eq(7)}$$

Once the main object is identified, the processor 130 would compute a viewing angle corresponding to the current frame by using a regressor RNN model based on the main object in the current frame (Step S208). In detail, the current step may be considered as a refinement step of the result obtained from the selector RNN model. In the present exemplary embodiment, the refinement step is at least based on the motion feature of the main object. The processor 130 would first obtain the motion feature of the main object as well as an action of the main object in the current frame according to the position of the main object and a viewing angle corresponding to the previous frame. Next, the processor would compute a current state of the regressor RNN model corresponding to the current frame based on the action and the motion feature of the main object in the current frame and a previous state of the regressor RNN model corresponding to the previous frame.

To be specific, assume that the position of the main object is $p_t^{i*}$ and the action $\hat{\Delta}_t$ at the time t instance is as follows, $$\hat{\Delta}_t = p_t^{i*} - l_{t-1}. \quad \text{Eq(8)}$$

The processor 130 would refine the action $\hat{\Delta}_t$ with the motion feature $m_t^{i*}$ of the main object as follows, $$\mu_t = RNN_R(con_F(m_t^{i*}, \hat{\Delta}_t), \mu_{t-1}) \quad \text{Eq(9)}$$

Herein, the motion feature $m_t^{i*}$ and the action $\hat{\Delta}_t$ obtained from the selector RNN model is concatenated to form the input at time t to the regressor RNN model. The regressor RNN model may update its state from the past state $\mu_{t-1}$ to the current state $\mu_t$. The processor 130 may then be able to compute the viewing angle corresponding to the current frame according to the current state of the regressor RNN model.

In an exemplary embodiment, the processor 130 would map the current state of the regressor RNN model according to an assigned weight in associated with a moving speed of the main object to obtain the refined action $\Delta_t$ as follows, $$\Delta_t = W_R \mu_t \quad \text{Eq(10)}$$

Note that the assigned weight $W_R$ may be determined in the model training stage based on the moving speed of the object and prestored in the data storage device 120. The viewing angle $l_t$ of the current frame at time t would then be given as follows, $$l_t = \Delta_t + l_{t-1} \quad \text{Eq(11)}$$

Note that $l_t = (\theta_t, \phi_t)$ is a point on the 360-degree viewing sphere that is parameterized by the azimuth angle $\theta_t \in [0°, 360°]$ and the elevation angle $\phi_t \in [-90°, 90°]$.

Finally, the processor 130 would display the current frame on the screen according to the viewing angle (Step S210). Since the viewing angle is computed based on the main object of interest of human gaze, a region around the viewing angle may be referred to as "a guided field" that is simulated as a natural field of view (NFoV, typically a 60-degree to 110-degree FoV) from the viewer's perspective. In an exemplary embodiment, the processor 130 may only display the guided field on the screen 110. In another exemplary embodiment, the processor 130 may display a prompt object along with the current frame on the screen 110, where the prompt object may indicate a location of the guided field. More details would be given later on.

Note that the processor 440 would perform Steps S202-S210 iteratively on other frames of the 360-degree video until its playback finishes or a pause/stop operation is detected. The sequence of the viewing angles would smoothly capture events of interest in the 360-degree video.

Figure 3:
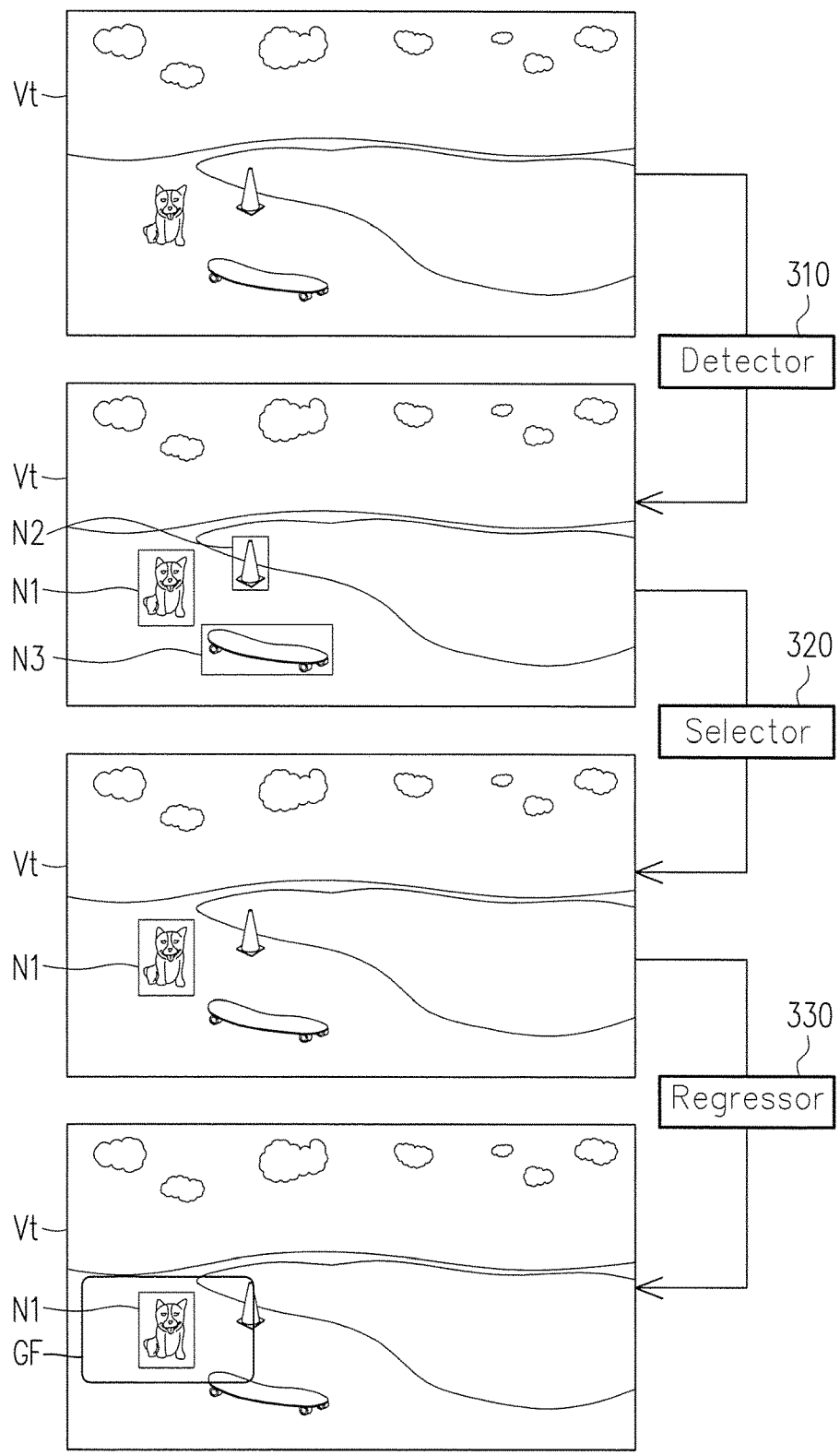
FIG. 3 illustrates a functional flow diagram of a method of 360-degree video playback in accordance with one of the exemplary embodiments of the disclosure.

For better comprehension, FIG. 3 illustrates a functional flow diagram that summarizes the proposed method of 360-degree video playback in accordance with one of the exemplary embodiments of the disclosure.

Referring to FIG. 3, the processor 130 would receive a current frame Vt. Next, the processor 130 would detect candidate objects N1-N3 from the current frame Vt by using a detector 310 and identify that the candidate object N1 may be a main object by using a RNN-based selector 320. The processor 130 would then obtain a guided field GF in associated with a computed viewing angle of the current frame Vt by using a RNN-based regressor 320.

It is worth noting that prior to video playback, the processor 130 would train and store the selector RNN model and the regressor RNN model in the data store device 120 by using 360-degree videos. For example, hundreds of 360-degree videos may be in different sports domains such as basketball, parkour, BMX, skateboarding, and dance may be obtained. The domains may be selected according to the following criteria: (i) high availability of such videos on any video-sharing website such as YouTube, (ii) featured as dynamic rather than static in the video content, and (iii) including a clear human-identifiable object of interest in most of the video frames. The third criterion is particularly important in order to obtain unambiguous ground truth viewing angle in all of the 360-degree videos.

In each domain, the top 200 videos are obtained and sorted by relevance. Then, videos that are either in poor resolution or stitching quality would then be removed. Net, a continuous video clip would be sampled and extracted from each video where a scene transition is absent (many 360-degree videos are edited and contain scene transitions). Finally, for each video segment including human-identifiable objects of interest, human annotators would be recruited to annotate it with ground truth viewing angles. As an example, 80% of the videos may be assigned for training and 20% for testing to learning the parameters in the selector RNN model and the regressor RNN in the model training stage.

Figure 4:
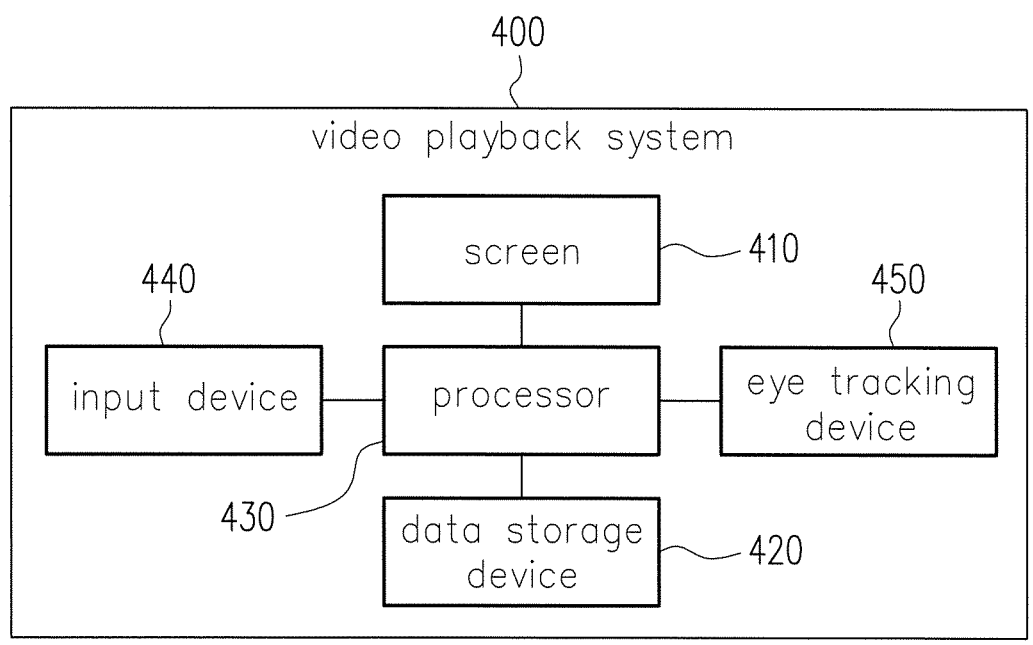
FIG. 4 illustrates a schematic block diagram of another video playback system in accordance with one of the exemplary embodiments of the disclosure.

FIG. 4 illustrates a schematic block diagram of another video playback system from the hardware perspective in accordance with one of the exemplary embodiments of the disclosure.

Referring to FIG. 4, an exemplary video playback system 400 would include, but not limited to, a screen 410, a data storage device 420, a processor 430, an input device 440, and an eye tracking device 450, where the processor 430 would be coupled to the screen 410, the data storage device 420, the input device 440, and the eye tracking device 450.

Herein, similar components to FIG. 1 are designated with similar numbers having a "4" prefix.

The input device 430 would be configured to receive an input from the viewer. The input device 430 may be a pointer device (e.g. a mouse, a stylus), a keyboard, a remote control, and so forth. Alternatively, the input device 430 may be touch detection components arranged in rows and columns in the screen 410 for detecting touch inputs by a finger or other objects. The touch detection components may be, for example, capacitive touch detection components, surface acoustic wave touch detection components, electromagnetic touch detection components, or near-field imaging touch detection components.

The eye tracking device 450 would be configured to detect a location of a viewer's gaze relative to the screen 410. The eye tracking device 450 may include hardware such as a camera or a camera with light emitter (e.g. an infrared camera) bundled with logic circuits or a chip with software that use any eye-tracking technology readily understood by the skilled artisan and as known in the art to track a viewer's eye movements. It should be noted that, in the present exemplary embodiment, the logic circuits or the chip with the software is embedded in the eye tracking device 450. Yet in another exemplary embodiment, the logic circuits or the software may also be implemented as part of the processor 440.

Figure 5:
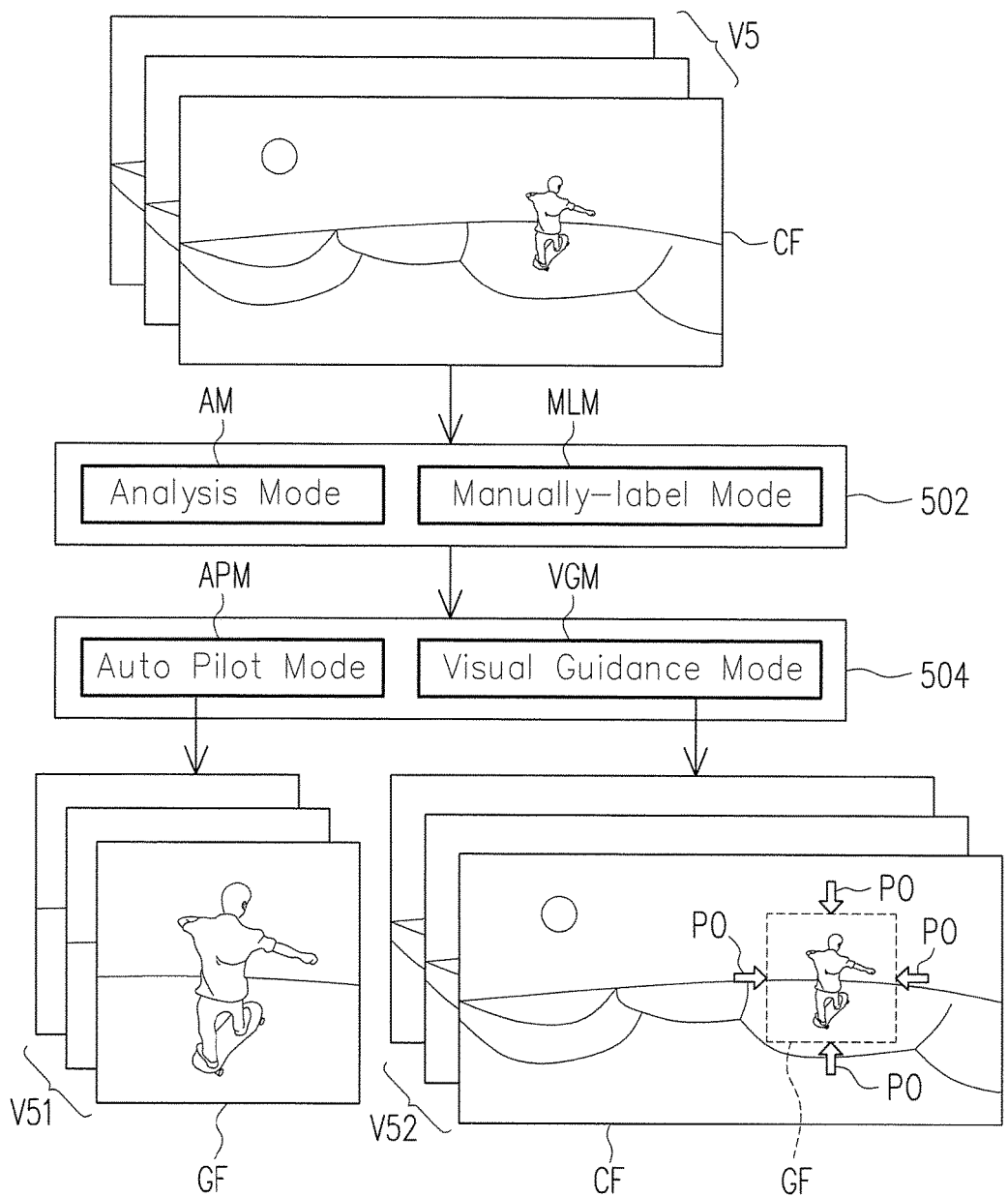
FIG. 5 illustrates a functional flow diagram of an application scenario of 360-degree video playback in accordance with one of the exemplary embodiments of the disclosure.

FIG. 5 illustrates a functional flow diagram of a method for 360-degree video playback in accordance with one of the exemplary embodiments of the disclosure.

Referring to FIG. 5 along with FIG. 4, the processor 440 would first receive a current frame CFt of a 360-degree video V5. Next, the processor 440 would provide the viewer to select from an analysis mode AM and a manually-label mode MLM (Block 502) to determine a viewing angle corresponding to the current frame CFt. In the analysis mode AM, the processor 440 would determine the viewing angle corresponding to the current frame CFt according to Steps S204-S208 which would not be discussed herein for brevity sake. In an exemplary embodiment, the analysis mode AM would be selected as a system default. In the manually-label mode MLM, the viewer would be able to select the viewing angle corresponding to the current frame CFt.

Next, the processor 140 would perform frame synthesize FS on the current frame CFt (Block 504). It should be noted that, prior to the 360-degree video V5 being received, the processor 440 would provide the viewer to select from an auto pilot mode APM or a visual guidance mode VGM.

In the auto pilot mode APM, the processor 440 would display only a guided field GF of the current frame CFt on the screen 410. For example, the guided field may be centering at the viewing angle. In other words, the guided field GF could be interpreted as a simulated NFoV from the viewer's perspective.

In the visual guidance mode VGM, the processor 440 would display prompt object PO along with the current frame CFt on the screen 410. In an exemplary embodiment, the prompt object PO may indicate a location of the guided field GF. In such case, the prompt object PO may be, for example, one or more arrows pointing toward the guided field GF and displayed at anywhere outside but close to the guided field GF for minimal viewing interference. In another exemplary embodiment, the prompt object PO may direct the viewer to the guided field according to the location of the viewer's gaze relative to the screen 410 detected by the eye tracking device 450. In such case, the prompt object PO may be, for example, an arrow that directs the viewer's gaze from his/her current location toward the guided field GF.

The processor 440 would perform the aforesaid steps iteratively on other frames in 360-degree video V5 until its playback finishes or a pause/stop operation is detected by the input device 440.

In view of the aforementioned descriptions, the disclosure provides a RNN-based 360-degree video playback technique to automatically select a viewing angle of each frame of a 360-degree video and thereby provide an elegant approach to accurately and smoothly capture events of interest in the 360-degree video.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for 360-degree video playback, applicable to a video playback system having a screen, comprising:
   receiving a current frame of a 360-degree video having a sequence of frames;
   detecting a plurality of candidate objects in the current frame;
   selecting a main object from the candidate objects by using a selector recurrent neural network (RNN) model based on information of the candidate objects in the current frame and a previous frame of the current frame comprising:
      computing a current state of the selector RNN model corresponding to the current frame based on the information of each of the candidate objects and a previous state of the selector RNN model corresponding to the previous frame; and
      classifying the main object from the candidate objects according to the current state of the selector RNN model;
   computing a viewing angle corresponding to the current frame by using a regressor RNN model based on the main object in the current frame and the previous frame comprising:
      obtaining an action of the main object in the current frame according to a position of the main object and a viewing angle corresponding to the previous frame and obtaining a motion feature of the main object in the current frame;
      computing a current state of the regressor RNN model corresponding to the current frame based on the action and the motion feature of the main object in the current frame and a previous state of the regressor RNN model corresponding to the previous frame; and computing the viewing angle corresponding to the current frame according to the current state of the regressor RNN model; and displaying the current frame on the screen according to the viewing angle.

2. The method according to claim 1, wherein the step of detecting the candidate objects in the current video frame comprises:

detecting a plurality of foreground objects in the current video frame; and setting the foreground objects as the candidate objects.

3. The method according to claim 1, wherein the information of each of the candidate objects comprises an appearance feature, a motion feature, and a position of each of the candidate objects.

4. The method according to claim 1, wherein the step of classifying the main object from the candidate objects according to the current state of the selector RNN model comprises:

mapping the current state of the selector RNN model to a probability distribution according to assigned weights of the candidate objects by using a softmax layer; and classifying the main object according to the probability distribution.

5. The method according to claim 1, wherein the step of computing the viewing angle corresponding to the current frame according to the current state of the regressor RNN model comprises:

mapping the current state of the regressor RNN model to a refined action of the main object according to an assigned weight in associated with a moving speed of the main object; and computing the viewing angle corresponding to the current frame according to the refined action of the main object in the current frame and the viewing angle corresponding to the previous frame.

6. The method according to claim 1, wherein before the step of receiving any frame of the 360-degree video, the method further comprises:

training the selector RNN model and the regressor RNN model by using a plurality of 360-degree videos comprising human-identifiable objects of interest.

7. The method according to claim 1 further comprising:
displaying another frame on the screen according to another viewing angle based on a viewer's input.

8. The method according to claim 1, wherein the step of displaying the current frame on the screen according to the viewing angle comprises:

displaying only a guided field of the current frame on the screen, wherein the guided field is a natural field of view with respect to the viewing angle of the current frame.

9. The method according to claim 8, wherein the prompt object indicates a location of the guided field.

10. The method according to claim 8, wherein the prompt object directs a viewer to the guided field according to a location of a viewer's gaze relative to the screen.

11. The method according to claim 1, wherein the step of displaying the current frame on the screen according to the viewing angle comprises:

displaying a prompt object along with the current frame on the screen according to a guided field of the current frame, wherein the guided field is a natural field of view with respect to the viewing angle of the current frame.

12. A system for 360-degree video playback comprising:
a screen;
a data storage device; and
a processor, coupled to the screen and the data storage device, wherein the processor is configured to:
receive a current frame of a 360-degree video having a sequence of frames;
detect a plurality of candidate objects in the current frame;
select a main object from the candidate objects by using a selector recurrent neural network (RNN) model based on information of the candidate objects in the current frame and a previous frame of the current frame by being configured to:
compute current state of the selector RNN model corresponding to the current frame based on the information of each of the candidate objects and a previous state of the selector RNN model corresponding to the previous frame; and
classify the main object from the candidate objects according to the current state of the selector RNN model;
compute a viewing angle corresponding to the current frame by using a regressor RNN model based on the main object in the current frame and the previous frame by being configured to:
obtain an action of the main object in the current frame according to a position of the main object and a viewing angle corresponding to the previous frame and obtaining the motion feature of the main object in the current frame;
compute a current state of the regressor RNN model corresponding to the current frame based on the action and a motion feature of the main object in the current frame and a previous state of the regressor RNN model corresponding to the previous frame; and
compute the viewing angle corresponding to the current frame according to the current state of the regressor RNN model; and
display the current frame on the screen according to the viewing angle.

13. The system according to claim 12, wherein the information of each of the candidate objects comprises an appearance feature, a motion feature, and a position of each of the candidate objects.

14. The system according to claim 12 further comprising:
an input device, configured to receive an input of a viewer, wherein the processor is further coupled to the input device and configured to:
displaying another frame on the screen according to another viewing angle based on the input of the viewer.

15. The system according to claim 12, wherein the processor is configured to:
display only a guided field of the current frame on the screen, wherein the guided field is a natural field of view with respect to the viewing angle of the current frame.

16. The system according to claim 12, wherein the processor is configured to:
displaying a prompt object along with the current frame on the screen according to a guided field of the current frame, wherein the guided field is a natural field of view with respect to the viewing angle of the current frame.

17. The system according to claim 16, wherein the processor is configured to:

display the prompt object that indicates a location of the guided field on the current frame.

18. The system according to claim 16 further comprising:

an eye tracking device, configured to determine a location of a gaze of a viewer relative to the screen, wherein the processor is coupled to the eye tracking device and configured to:

display the prompt object that directs a viewer to the guided field on the current frame according to the location of the gaze of the viewer relative to the screen.

* * * * *